(12) United States Patent
Wang et al.

(10) Patent No.: US 12,517,063 B2
(45) Date of Patent: *Jan. 6, 2026

(54) AUTOMATIC CLEANER

(71) Applicant: PixArt Imaging Inc., Hsin-Chu (TW)

(72) Inventors: Guo-Zhen Wang, Hsin-Chu (TW);
Hung-Ching Lai, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 229 days.

This patent is subject to a terminal disclaimer.

(21) Appl. No.: 18/202,944

(22) Filed: May 28, 2023

(65) Prior Publication Data

US 2023/0304942 A1 Sep. 28, 2023

Related U.S. Application Data

(62) Division of application No. 17/393,424, filed on Aug. 4, 2021, now Pat. No. 11,703,458.

(60) Provisional application No. 63/121,969, filed on Dec. 6, 2020.

(51) Int. Cl.
*G01N 21/94* (2006.01)
*B25J 9/16* (2006.01)
*B25J 11/00* (2006.01)
*G01N 21/88* (2006.01)

(52) U.S. Cl.
CPC ............ *G01N 21/94* (2013.01); *B25J 9/1697* (2013.01); *B25J 11/0085* (2013.01); *G01N 21/8806* (2013.01)

(58) Field of Classification Search
CPC ......... G05D 1/00; A47L 9/2826; A47L 11/24; A47L 11/4002; A47L 11/4011; A47L 2201/06; B25J 9/1697; B25J 11/0085; G01N 21/3151; G01N 21/8806; G01N 21/94
See application file for complete search history.

(56) References Cited

U.S. PATENT DOCUMENTS 6,680,479 B1 1/2004 Murray
8,719,998 B1 5/2014 Huffman
9,074,355 B2 7/2015 Jallon
(Continued)

FOREIGN PATENT DOCUMENTS

CN 108742333 A 11/2018
CN 108968805 A 12/2018
(Continued)

*Primary Examiner* — Thomas E Worden
*Assistant Examiner* — Blake A Wood
(74) *Attorney, Agent, or Firm* — Winston Hsu

(57) ABSTRACT

The present invention discloses an automatic cleaner for cleaning a surface. The automatic cleaner comprises: a light emitting device, configured to emit first light, wherein a first angle exists between a first emitting direction of the first light and the surface when the automatic cleaner is located on the surface, wherein the first angle is larger than 0° and smaller than 90°; an optical sensor, configured to detect first optical data generated based on the first light; and a processing circuit, configured to determine if the liquid or the colloid exists in a predetermined range of the automatic cleaner based on the first optical data. The processing circuit further determines a location of the automatic cleaner on the surface according to navigation optical data.

1 Claim, 6 Drawing Sheets

(56) References Cited

U.S. PATENT DOCUMENTS

| | | | |
|---|---|---|---|
| 2009/0218478 A1* | 9/2009 | Kim | G05D 1/0242 |
| | | | 250/221 |
| 2009/0223635 A1* | 9/2009 | Lawless | G01N 21/94 |
| | | | 250/206 |
| 2015/0362921 A1* | 12/2015 | Hanaoka | G05D 1/0274 |
| | | | 702/159 |
| 2017/0071436 A1* | 3/2017 | Hofner | A47L 11/4036 |
| 2017/0332872 A1 | 11/2017 | Jun | |
| 2019/0029486 A1 | 1/2019 | Suvarna | |
| 2020/0114517 A1* | 4/2020 | Wang | B25J 11/0085 |
| 2020/0315421 A1* | 10/2020 | Kung | G08B 21/02 |
| 2021/0157237 A1 | 5/2021 | Hayashi | |
| 2022/0128352 A1 | 4/2022 | Binder | |

FOREIGN PATENT DOCUMENTS

| | | |
|---|---|---|
| CN | 110558902 A | 12/2019 |
| CN | 110658131 A | 1/2020 |
| CN | 111000491 A | 4/2020 |
| CN | 111000498 A | 4/2020 |
| CN | 111246204 A | 6/2020 |
| JP | 2-147846 A | 6/1990 |
| TW | 201808197 A | 3/2018 |

\* cited by examiner

AUTOMATIC CLEANER

CROSS REFERENCE TO RELATED APPLICATIONS

This application is a division of U.S. application Ser. No. 17/393,424, filed on Aug. 4, 2021, which claims the benefit of U.S. Provisional Application No. 63/121,969, filed on Dec. 6, 2020. The contents of these applications are incorporated herein by reference.

BACKGROUND OF THE INVENTION

1. Field of the Invention

The present invention relates to an automatic cleaner, and particularly relates to an automatic cleaner which can detect liquid or colloid.

2. Description of the Prior Art

An automatic cleaner (e.g., a robot cleaner) becomes more and more popular recently. The automatic cleaner can determine a location thereof and accordingly performs a clean action. However, a conventional automatic cleaner does not have a function of detecting liquid or colloid, thus may still perform the clean action to the liquid or the colloid even if the automatic cleaner does not have the ability of cleaning the liquid and the colloid. Such operation may cause some inconvenience to the user. For example, the automatic cleaner is a vacuum cleaner but still try to clean the liquid and the colloid. Such operation may cause the environment surrounding it to be more terrible.

SUMMARY OF THE INVENTION

One objective of the present invention is to provide an automatic cleaner which can detect liquid or colloid.

One embodiment of the present invention is to provide an automatic cleaner, for cleaning a surface, comprising: a light emitting device, configured to emit first light, wherein a first angle exists between a first emitting direction of the first light and the surface when the automatic cleaner is located on the surface, wherein the first angle is larger than 0° and smaller than 90°; an optical sensor, configured to detect first optical data generated based on the first light; and a processing circuit, configured to determine if the liquid or the colloid exists in a predetermined range of the automatic cleaner based on the first optical data; wherein the processing circuit further determines a location of the automatic cleaner on the surface according to navigation optical data.

In view of above-mentioned embodiments, the liquid or colloid can be detected based on optical data. Also, the light emitting device emitting light for liquid/colloid detection can be assembled more easily.

These and other objectives of the present invention will no doubt become obvious to those of ordinary skill in the art after reading the following detailed description of the preferred embodiment that is illustrated in the various figures and drawings.

DETAILED DESCRIPTION

Several embodiments are provided in following descriptions to explain the concept of the present invention. Each component in following descriptions can be implemented by hardware (e.g. a device or a circuit) or hardware with software (e.g. a program installed to a processor). Besides, the term "first", "second", "third" in following descriptions are only for the purpose of distinguishing different one elements, and do not mean the sequence of the elements. For example, a first device and a second device only mean these devices can have the same structure but are different devices.

Additionally, in following embodiments, an automatic cleaner is taken as an example for explaining. However, the concept provided by the present invention can be applied to any other detecting device, which does not perform a clean action. Furthermore, in following descriptions, if it states "an angle exists between A and B", it can mean A and B really touches and the angle exists between A and B. However, the descriptions "an angle exists between A and B" can also mean A and B do not physically touch and the angle exists between an extension line of A and B itself, or means the angle exists between A itself and an extension line of B. Additionally, in following descriptions, the term "liquid/colloid" means "liquid or colloid".

Figure 1:
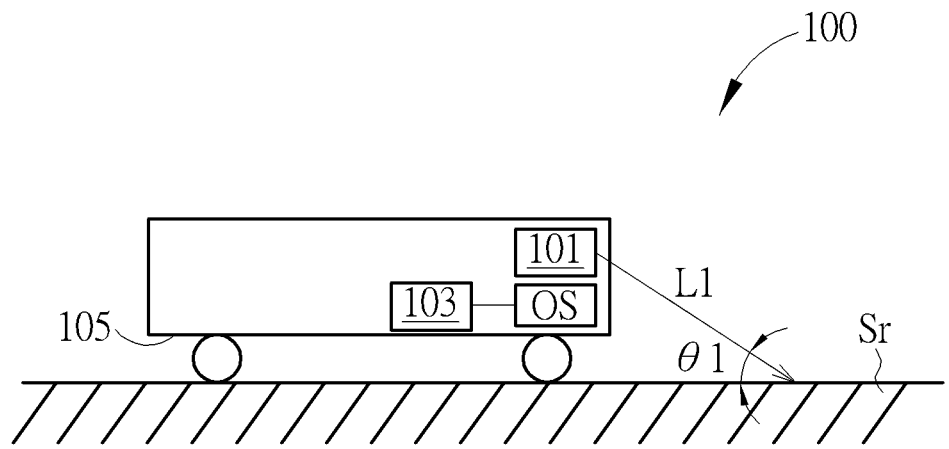
FIG. 1 is a schematic diagram illustrating an automatic cleaner according to one embodiment of the present invention.

FIG. 1 is a schematic diagram illustrating an automatic cleaner 100 according to one embodiment of the present invention. As illustrated in FIG. 1, the automatic cleaner 100 comprises a light emitting device 101, an optical sensor OS, and a processing circuit 105. Please note, although the optical sensor OS and the light emitting device 101 are two independent devices in the embodiment of FIG. 1, the optical sensor OS can be integrated to the light emitting device 101 in other embodiments. Such embodiments will be described for more detail later.

The light emitting device 101 is configured to emit first light L1. A first angle $\theta_1$ exists between a first emitting direction of the first light L1 and a surface Sr when the detecting device 100 is located on the surface Sr, wherein the first angle $\theta_1$ is larger than 0° and smaller than 90°. In other words, the light emitting device 101 is configured to emit first light L1 to the surface Sr, and the first light L1 is neither perpendicular with the surface Sr nor parallel with the surface Sr. The optical sensor OS is configured to detect first optical data (e.g., image or any optical data having optical features) generated based on the first light L1. The processing circuit 103 is configured to determine if the liquid or the colloid exists in a predetermined range of the automatic clean machine 100 based on the first optical data. The automatic cleaner 100 can be controlled according to the determining result of the processing circuit 103. For example, if the liquid or the colloid exists, the automatic cleaner 100 can be controlled to bypass the liquid or the colloid rather than clean it.

The surface Sr can be any surface, for example, a ground surface or a furniture surface. The first angle $\theta_1$ can be set corresponding to different requirements. For example, if the first light L1 has a strong light intensity (or called luminous intensity), the first angle $\theta_1$ can be set to be smaller such that the first light L1 can be emitted to a location farer from the light emitting device 101. On the opposite, if the first light L1 has a weak light intensity, the first angle $\theta_1$ can be set to be larger such that the first light L1 is emitted to a location closer to the light emitting device 101. Please note, the above-mentioned first angle $\theta_1$ can also be regarded as an angle between a bottom surface 105 and the first direction, if the bottom surface 105 is parallel with the surface Sr when the automatic clean machine 100 is located on the surface Sr.

Additionally, in one embodiment, the first angle $\theta_1$ is related with a sensing ability of the optical sensor OS. If the optical sensor OS has a good sensing ability, the first angle $\theta_1$ can be smaller since the optical sensor OS can detect first optical data farer from it. On the opposite, if the optical sensor OS has a poor sensing ability, the first angle $\theta_1$ can be larger since the optical sensor OS only can detect first optical data close to it. Also, in one embodiment, the first angle $\theta_1$ can be changed when the automatic clean machine 100 is operating.

The above-mentioned predetermined range can be any required range. In one embodiment, the predetermined range means a range of the surface Sr that the first light L1 can reach. In another embodiment, the predetermined range is a predefined range. Additionally, in one embodiment, the light emitting device 101 emits the first light L1 following a moving direction of the automatic cleaner 100, to detect if the liquid or the colloid is in the predetermined range in front of the light emitting device 101.

In one embodiment, the processing circuit 103 is further configured to determine a location of the automatic clean machine 100 according to navigation optical data. The navigation optical data can be the above-mentioned first optical data, or the optical data generated based on light from another light source which is not comprised in the light emitting device 101. After the location of the automatic clean machine 100 is acquired, the automatic clean machine 100 is controlled accordingly. For example, the automatic clean machine 100 is controlled to perform the clean operation accordingly to a plurality of locations thereof. Details of controlling the automatic clean machine 100 according to locations thereof are well known by persons skilled in the art, thus are omitted for brevity here. As above-mentioned, the concept disclosed by the present invention can be applied to any other detecting device. In such case, the function of "detecting a location based on navigation optical data" can be removed from the processing circuit 103.

Figure 2:
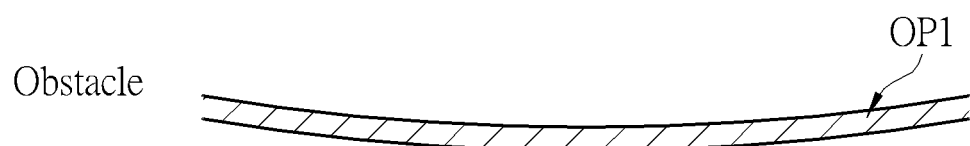
FIG. 2 and FIG. 3 are schematic diagrams illustrating how to determine liquid or colloid based on optical data, according to embodiments of the present invention.
Figure 2:
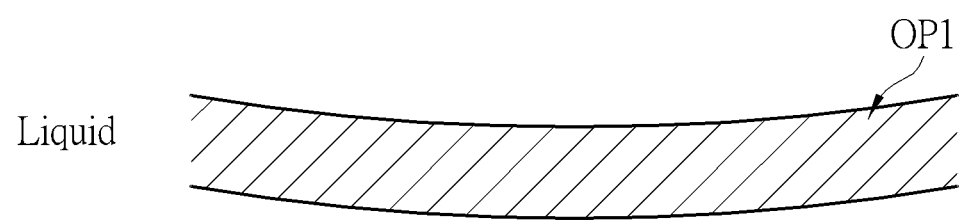
Figure 3:
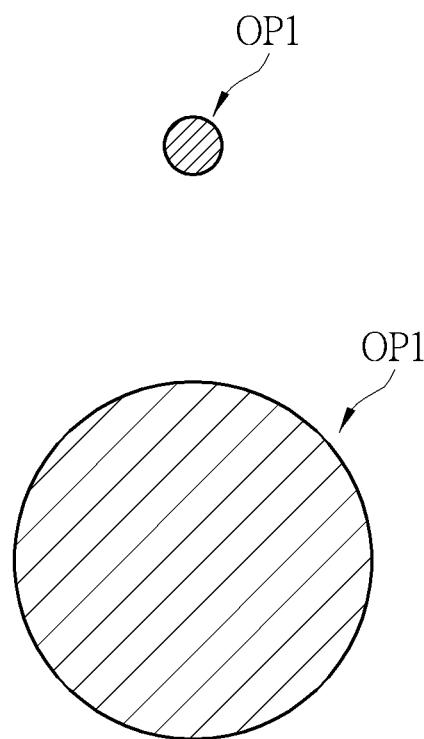

In one embodiment, the processing circuit 103 determines if the liquid or the colloid exists in the predetermined range according a spreading level of reflected light of the first light L1. FIG. 2 and FIG. 3 are schematic diagrams illustrating how to determine liquid or colloid according to embodiments of the present invention. In the embodiment of FIG. 2, the first light L1 is line light. If the line light is emitted to an obstacle, such as furniture, most of the line light is reflected or absorbed, thus the first optical data OP1 formed by the line light has a narrower curve shape, as shown in the upper diagram in FIG. 2. On the contrary, if the line light is emitted to liquid or colloid, the line light is spread since the liquid or colloid has light guide ability, thus the first optical data OP1 has a wider curve shape as shown in the lower diagram in FIG. 2.

Also, in the embodiment of FIG. 3, the first light L1 is point light. If the point light is emitted to an obstacle, such as furniture, most of the point light is reflected or absorbed, thus the first optical data OP1 formed by the line light has a smaller point shape, as shown in the upper diagram in FIG. 3. On the contrary, if the line light is emitted to liquid or colloid, the line light is spread since the liquid or colloid has light guide ability, thus the first optical data OP1 has a larger point shape as shown in the lower diagram in FIG. 3.

Figure 4:
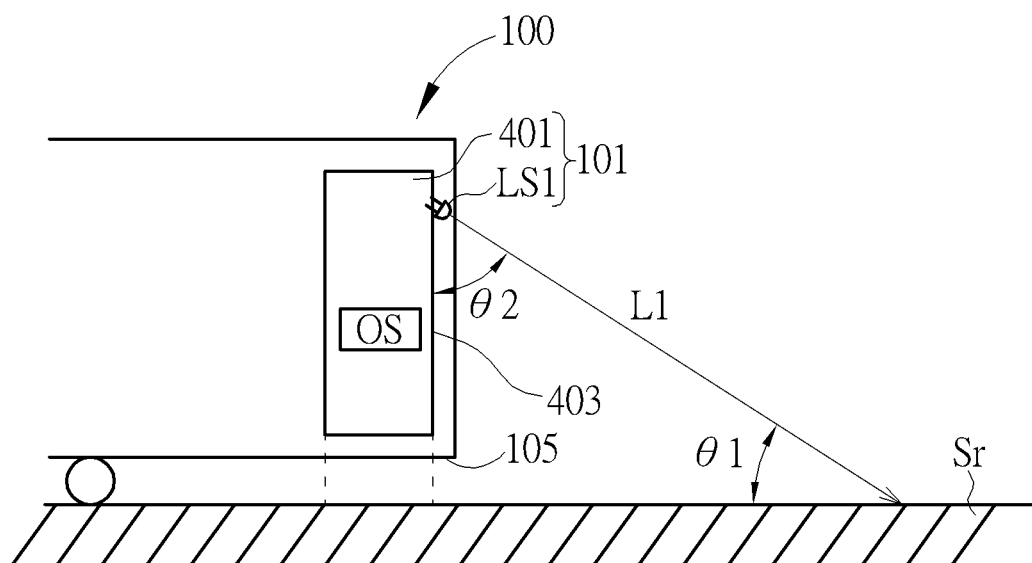
FIG. 4, FIG. 5 and FIG. 6 are schematic diagrams illustrating light emitting devices according to different embodiments of the present invention.
Figure 5:
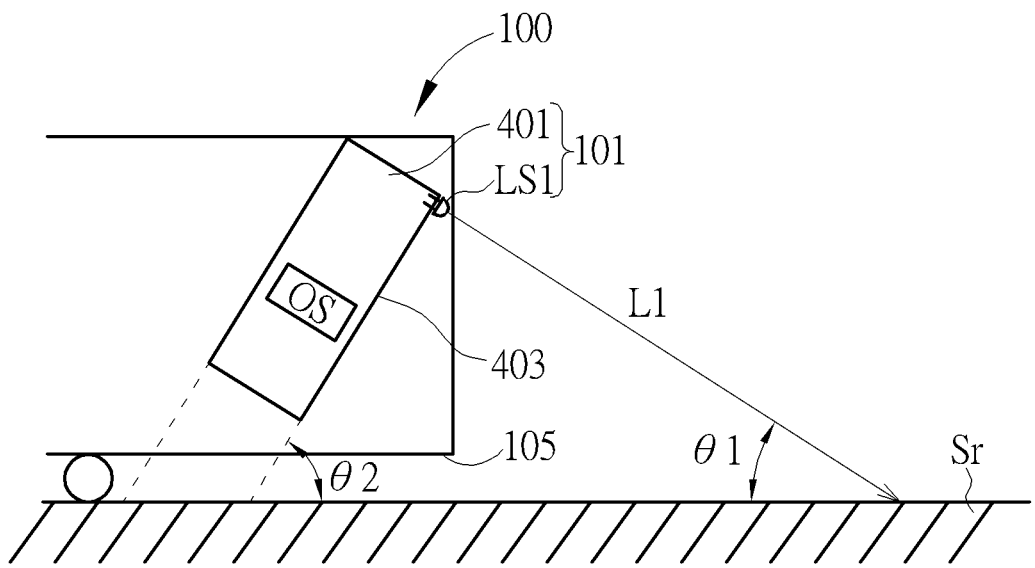
Figure 6:
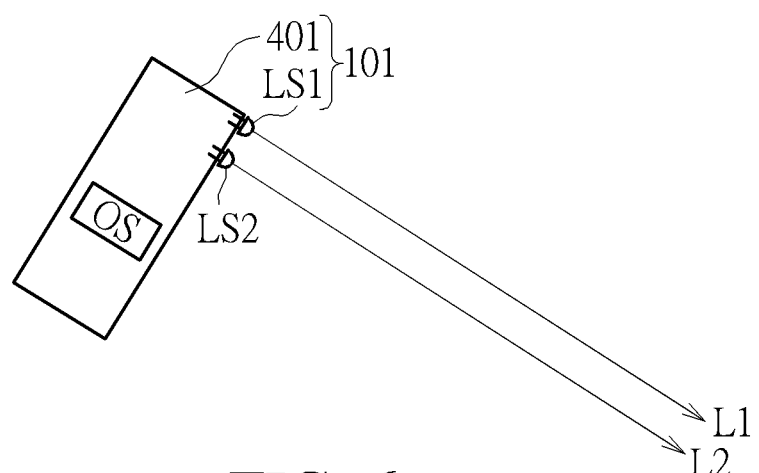

The above-mentioned light emitting device 101 can have various structures. FIG. 4, FIG. 5 and FIG. 6 are schematic diagrams illustrating light emitting devices according to different embodiments of the present invention. As shown in FIG. 4, the light emitting device 101 comprises a circuit board 401 and a first light source LS1. The circuit board 401 comprises a board surface 403 perpendicular with the surface Sr. Namely, the board surface 403 is perpendicular with the bottom surface 105 when the bottom surface 105 is parallel with the surface Sr. The first light source LS1 is provided on the circuit board 401 and configured to emit the first light L1, wherein a second angle $\theta 2$ exists between the board surface 403 and the first emitting direction, wherein a sum of the first angle $\theta 1$ and the second angle $\theta 2$ is 90°. In other words, in the embodiment of FIG. 4, the circuit board 401 is perpendicular with the surface Sr or the bottom surface 105, and the first light source LS1 is inclined to the board surface 403.

Please note, in the embodiment of FIG. 4, the optical sensor OS is located in or on the circuit board 401. However, the optical sensor OS can be a device physically independent form the circuit board 401.

In the embodiment of FIG. 5, the light emitting device 101 also comprises the circuit board 401 and the first light source LS1. The circuit board 401 comprises a board surface 403. A second angle $\theta 2$ exists between the circuit board 401 and the surface Sr, wherein a sum of the first angle $\theta 1$ and the second angle $\theta 2$ is 90°. Namely, a second angle $\theta 2$ exists between the board surface 403 and the bottom surface 105 when the bottom surface 105 is parallel with the surface Sr. The first light source LS1 is provided on the board surface 403 and configured to emit the first light L1, wherein the first emitting direction is perpendicular with the board surface 403. In other words, in the embodiment of FIG. 5, the circuit board 401 is inclined to the surface Sr or the bottom surface 105 when the first light source LS1 is perpendicular with the board surface 403.

Please note, in the embodiment of FIG. 5, the optical sensor OS is located in or on the circuit board 401. However, the optical sensor OS can be physically independent form the circuit board 401. In the embodiment in FIG. 5, the circuit board 401 can be assembled to the automatic cleaner more easily since only an assemble part corresponding a tilt angle of the circuit board 401 is needed. Further, since the circuit board 401 is tilted, the optical sensor OS provided thereon or therein can detect a larger range, thus the first optical data can still be clearly sensed even if the first light L1 has a weak light intensity or the first light emits a region far from the optical sensor OS. Also, the embodiment in FIG. 4 and FIG. 5 can be combined. For example, the first light source LS1 is inclined to the board surface 403 when the circuit board 401 is inclined to the bottom surface 105 or the surface Sr.

In one embodiment, the light emitting device 101 is further configured to emit second light L2 (not illustrated in FIG. 1). That is, the light emitting device 101 comprises a plurality of light sources. The first light L1 has a first wavelength and the second light L2 has a second wavelength different from the first wavelength. In one embodiment, the first wavelength is 850 nm and the second wavelength is 440 nm, but not limited.

Figure 9:
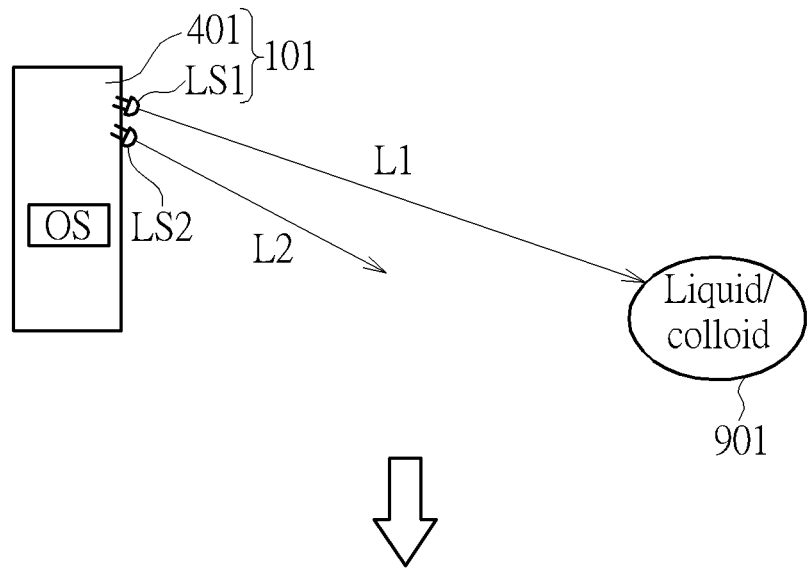
FIG. 9 and FIG. 10 are schematic diagrams illustrating light emitting devices according to different embodiments of the present invention.
Figure 9:
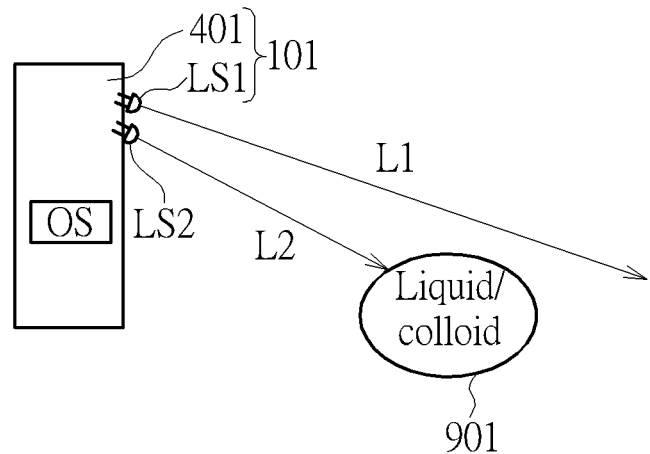
Figure 10:
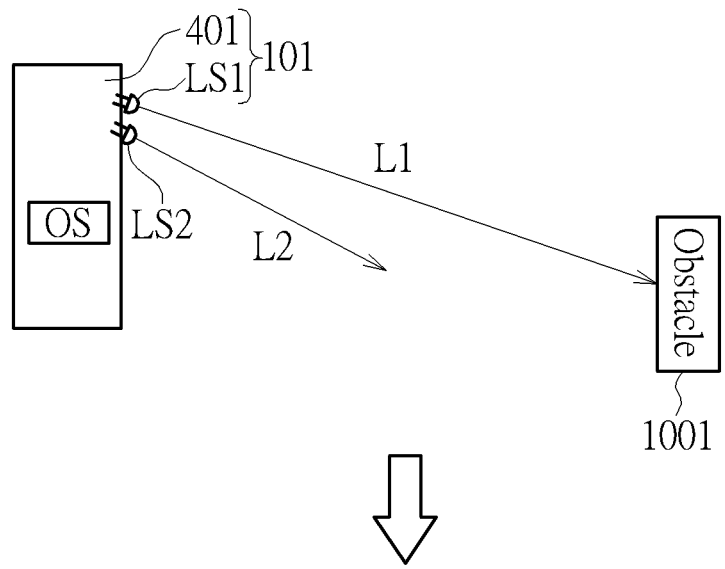
Figure 10:
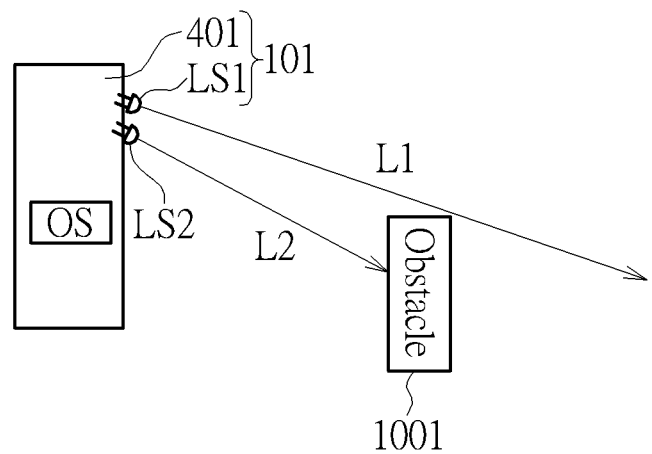

FIG. 6 is illustrated an example of the light emitting device 101 which comprises a plurality of light sources. Please note, the embodiment in FIG. 5 is applied as an example in FIG. 6, but FIG. 6 can apply any other light emitting device, such as the embodiment illustrated in FIG. 4. For example, the embodiments in FIG. 9 and FIG. 10 illustrate an embodiment in which the light emitting device in FIG. 4 has more than one light source.

As illustrated in FIG. 6, the first light source LS1 and the second light source LS2 are respectively provided on the circuit board 401. The first light source LS1 is configured to emit the first light L1 and the second light source LS2 is configured to emit the second light L2. In one embodiment, the second emitting direction of the second light source LS2 is parallel with the first emitting direction, but not limited.

In one embodiment, both the first light L1 and the second light L2 are applied for detecting the liquid or the colloid. In such embodiment, the first light L1 and the second light L2 can be alternatively used for detecting the liquid or the colloid. For example, the processing circuit 103 determines if the liquid or the colloid exists according to the first optical data generated based on the first light L1 and the second optical data generated based on the second light L2, and determines the liquid or the colloid really exists when the processing circuit 103 determines the liquid or the colloid exists based on the first optical data and determines the liquid or the colloid exists based on the second optical data. In such example, the processing circuit 103 does not determine the liquid or the colloid exists when the processing circuit 103 determines the liquid or the colloid does not exist based on the first optical data or determines the liquid or the colloid does not exist based on the second optical data. On the contrary, the processing circuit 103 determines the liquid or the colloid exists when the processing circuit 103 determines the liquid or the colloid exists based on the first optical data and determines the liquid or the colloid exist based on the second optical data.

In one embodiment, the first light L1 and the second light L2 are applied for different functions. For example, one of the first light L1 and the second light L2 is applied for detecting an obstacle and the other one of the first light L1 and the second light L2 is applied for detecting the liquid or the colloid, such as the embodiments illustrated in FIG. 9 and FIG. 10.

Figure 7:
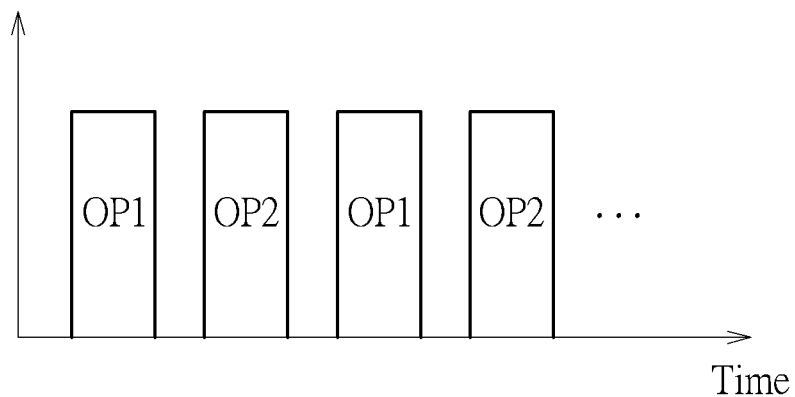
FIG. 7 and FIG. 8 are schematic diagrams illustrating operations of a light emitting device comprising two light sources, according to different embodiments of the present invention.
Figure 8:
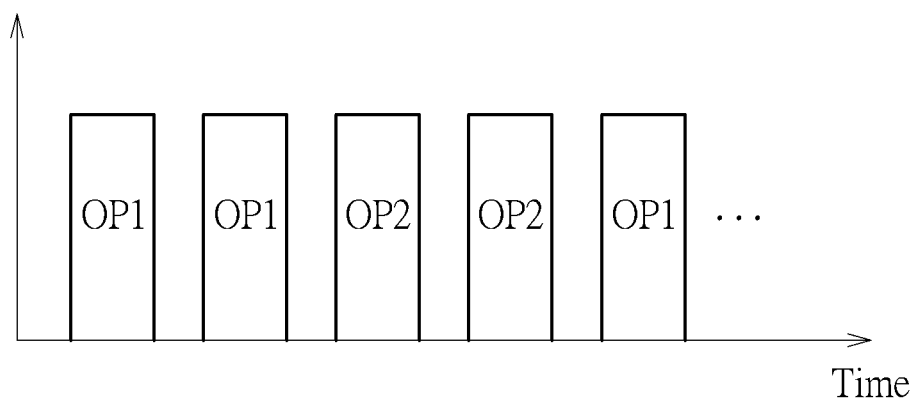

In one embodiment, the light emitting device 101 emits the first light L1 and the second light L2 at different time. FIG. 7 and FIG. 8 are schematic diagrams illustrating operations of a light emitting device comprising two light sources, according to different embodiments of the present invention. As illustrated in FIG. 7, the first light L1 and the second light L2 are alternatively emitted thus the optical sensor OS alternatively senses the first optical data OP1 and the second optical data OP2. In the embodiment of FIG. 8, the first light L1 is emitted for a plurality of times (in this example, 2 times) and then is switched the second light L2. After that, the second light L2 is emitted for a plurality of times (in this example, 2 times) and then is switched to the first light L1. Therefore, the optical sensor OS senses the same type of optical data for a plurality times and then switched to another type of optical data.

In one embodiment, the light emitting device which comprises more than one light source can provide more accurate liquid/colloid detection. FIG. 9 and FIG. 10 are schematic diagrams illustrating light emitting devices according to different embodiments of the present invention. Please note, in the embodiments of FIG. 9 and FIG. 10, the embodiment in FIG. 4 is modified to have two light sources for explaining. In the embodiments of FIG. 9 and FIG. 10, the first light L1 can be applied for obstacle detection (or named object detection), and the second light L2 can be applied for liquid/colloid detection.

In an upper diagram of FIG. 9, a distance between the automatic cleaner 100 and the liquid/colloid 901 is a first distance. In such case, only the first light L1 can reach the liquid/colloid 901, since the automatic cleaner 100 is far away from the liquid/colloid 901. However, since the automatic cleaner 100 is far away from the liquid/colloid 901, the optical sensor OS only senses few of light guided by the liquid/colloid 901, thus the automatic cleaner 100 could not detect that the liquid/colloid 901 exists. Also, in the lower diagram of FIG. 9, a distance between the automatic cleaner 100 and the liquid/colloid 901 is a second distance smaller than the first distance. In such case, only the second light L2 can reach the liquid/colloid 901, since the automatic cleaner 100 is close to the liquid/colloid 901. Therefore, the automatic cleaner 100 can detect that the liquid/colloid 901 exists.

In an upper diagram of FIG. 10, a distance between the automatic cleaner 100 and the obstacle 1001 (or named an object) is a third distance. In such case, only the first light L1 can reach the obstacle 1001, since the automatic cleaner 100 is far away from the obstacle 1001. Although the automatic cleaner 100 is far away from the obstacle 1001, the optical sensor OS can still sense reflected light from the obstacle 1001 since the obstacle 1001 can reflected light generated by the obstacle 1001 maybe stronger than the reflected light generated by the liquid/colloid 901, thus the automatic cleaner 100 can detect that the obstacle 1001 exists. Also, in the lower diagram of FIG. 10, a distance between the automatic cleaner 100 and the obstacle 1001 is a fourth distance smaller than the third distance. In such case, only the second light L2 can reach the obstacle 1001, since the automatic cleaner 100 is close to the obstacle 1001. The automatic cleaner 100 may wrongly determine the obstacle 1001 is liquid/colloid if the obstacle 1001 has light guide ability.

Accordingly, in view of the embodiments of FIG. 9, the automatic cleaner 100 determines the liquid/colloid really exists if no liquid/colloid is detected based on the first light L1 and then the liquid/colloid is detected based on the second light L2. On the contrary, in view of the embodiments of FIG. 10, the automatic cleaner 100 determines the liquid/colloid does not exist if an obstacle is detected based on the first light L1 and then the liquid/colloid is detected based on the second light L2.

In other words, the processing circuit 103 shown in FIG. 1 determines if an obstacle exists based on the first optical data generated according to the first light L1 and determines if the liquid or the colloid exists based on the second optical data generated according to the second light L2. The processing circuit 103 determines the liquid/colloid exists if no liquid/colloid is detected based on the first optical data and then the liquid or the colloid is detected based on the second optical data. On the contrary, the processing circuit 103 determines the liquid/colloid does not exist if an obstacle is detected based on the first optical data and then the liquid/ colloid is detected based on the second optical data. By this, the detection of liquid/colloid can be more accurate.

In view of above-mentioned embodiments, the liquid or colloid can be detected based on optical data. Also, the light emitting device emitting light for liquid/colloid detection can be assembled more easily.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An automatic cleaner, for cleaning a surface, comprising:
   a light emitting device, configured to emit a first light, wherein a first angle exists between a first emitting direction of the first light and the surface when the automatic cleaner is located on the surface, wherein the first angle is larger than 0° and smaller than 90°;
   an optical sensor, configured to detect first optical data generated based on the first light; and
   a processing circuit, configured to determine if a liquid or a colloid exists in a predetermined range of the automatic cleaner based on the first optical data;
   wherein the light emitting device is further configured to emit a second light, wherein the first light has a first wavelength and the second light has a second wavelength different from the first wavelength;
   wherein the processing circuit determines the liquid and the colloid do not exist if an obstacle is detected based on the first light and then the liquid or the colloid is detected based on the second light.

* * * * *